(12) United States Patent
Yamamoto

(10) Patent No.: US 6,882,687 B2
(45) Date of Patent: Apr. 19, 2005

(54) COMPRESSED IMAGE DATA REPRODUCING APPARATUS AND METHOD THEREOF

(75) Inventor: Naoto Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 727 days.

(21) Appl. No.: 09/741,506

(22) Filed: Dec. 19, 2000

(65) Prior Publication Data

US 2001/0004386 A1 Jun. 21, 2001

(30) Foreign Application Priority Data

Dec. 20, 1999 (JP) .......................................... 11-360912

(51) Int. Cl.⁷ ................................................ H04N 7/12
(52) U.S. Cl. ............................ 375/240.12; 375/240.16; 382/238
(58) Field of Search ....................... 375/240.12, 240.13, 375/240.16, 240.23; 382/238, 239

(56) References Cited

U.S. PATENT DOCUMENTS

| | | | | |
|---|---|---|---|---|
| 6,052,417 A | * | 4/2000 | Fujiwara et al. | 375/240.12 |
| 6,118,928 A | * | 9/2000 | Kawakami et al. | 386/109 |
| 6,271,774 B1 | * | 8/2001 | Kato | 341/52 |
| 6,343,153 B1 | * | 1/2002 | Kawasaki et al. | 382/239 |
| 6,560,282 B1 | * | 5/2003 | Tahara et al. | 375/240.02 |

FOREIGN PATENT DOCUMENTS

| | | |
|---|---|---|
| JP | HEI 7-30850 | 1/1995 |
| JP | HEI 7-250329 | 9/1995 |
| JP | 11-155129 | 6/1999 |

* cited by examiner

*Primary Examiner*—Jeffery Hofsass
*Assistant Examiner*—George Bugg
(74) *Attorney, Agent, or Firm*—Scully, Scott, Murphy & Presser

(57) ABSTRACT

A compressed image data reproducing apparatus and a compressed image data reproducing method, in which a smooth reproduced image and a non-linear editing reproduction can be realized at the time when an IP picture search is executed, are provided. A storage device memorizes a structure of a data file in which intervals between an intra-coded frame and inter-coded frames of P pictures are variable as control data. A system control circuit, based on an external control signal, and by using a storage device control signal that executes normal reproduction of images, a picture search, and non-linear editing reproduction of images, outputs a first decoder control signal to a first decoder, a second decoder control signal to a second decoder, and a circuit selection control signal to a selector. With this, at the time when image data that are compressed and coded by variable length codes are reproduced, motion compensation by using a time correlation is executed. Therefore, the high speed picture search by using the control data can be possible, and various editing reproduction functions can be realized by that variable value M in a GOP is stored in a frame unit.

11 Claims, 11 Drawing Sheets

FIG. 6

| GOP NUMBER | STARTING ADDRESS | M STRUCTURE 0 | M STRUCTURE 1 | M STRUCTURE 2 | M STRUCTURE 3 | M STRUCTURE 4 |
|---|---|---|---|---|---|---|
| 0 | 0 | 3 | 3 | 1 | 3 | 3 |
| 1 | 7 | 3 | 3 | 3 | 1 | 1 |
| 2 | 21 | 1 | 1 | 1 | 1 | 1 |
| 3 | 35 | 3 | 3 | 3 | 3 | 3 |
| 4 | 47 | 3 | 3 | 3 | 3 | 3 |

F I G. 8

| GOP NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | *I2* | B0 | B1 | *P5* | B3 | B4 | *P6* | P7 | P8 | P11 | B9 | B10 | P14 | B12 | B13 |
| 1 | *117* | B15 | B16 | *P20* | B18 | B19 | *P23* | B21 | B22 | *P24* | P25 | P26 | P27 | P28 | P29 |
| 2 | *130* | P31 | P32 | *P33* | P34 | P35 | *P36* | P37 | P38 | *P39* | P40 | P41 | *P42* | P43 | P44 |
| 3 | *147* | B45 | B46 | *P50* | B48 | B49 | *P53* | B51 | B52 | *P56* | P40 | B55 | *P59* | B57 | B58 |
| 4 | *162* | B60 | B61 | *P65* | B63 | B64 | *P68* | B66 | B67 | *P77* | B69 | B70 | *P74* | B72 | B73 |

FIG. 9

| ORDER OF REPRODUCTION | 1 | 2 | 3 | 4 | 5 | 6 | 7 | 8 | 9 | 10 | 11 | 12 |
|---|---|---|---|---|---|---|---|---|---|---|---|---|
| OUTPUT AT NORMAL REPRODUCTION | B0 | B1 | I2 | B3 | B4 | P5 | B6 | B7 | P8 | B9 | B10 | P11 |
| CONTROL DATA | | 3 | | | 3 | | | 3 | | | 3 | |
| INPUT TO FIRST DECODER | DI2 | DB0 | DB1 | DP5 | DB3 | DB4 | DP8 | DB6 | DB7 | DP11 | DB9 | DB10 |
| OUTPUT FROM FIRST DECODER | | B0 | B1 | I2 | B3 | B4 | P5 | B6 | B7 | P8 | B9 | B10 |
| INPUT TO SECOND DECODER | | DI2 | DP5 | DP8 | DP7 | DP11 | DB9 | DB10 | | | | |
| OUTPUT FROM SECOND DECODER | | | | | B7 | P8 | B9 | B10 | P11 | | | |
| OUTPUT SELECTION | 1 | 1 | 1 | 1 | 2 | 2 | 2 | 2 | 2 | | | |
| REPRODUCED OUTPUT | B0 | B1 | I2 | B3 | B7 | P8 | B9 | B10 | P11 | | | |

FIG. 10

| ORDER OF REPRODUCTION | 1 | 2 | 3 | 4 | 5 | 6 | 7 | 8 | 9 | 10 | 11 | 12 |
|---|---|---|---|---|---|---|---|---|---|---|---|---|
| OUTPUT AT NORMAL REPRODUCTION | B0 | B1 | I2 | P3 | P4 | P5 | B6 | B7 | P8 | B9 | B10 | P11 |
| CONTROL DATA | | 3 | | | 1 | | | 3 | | | 3 | |
| INPUT TO FIRST DECODER DI2 | DB0 | DB1 | DP3 | | | | | | | | | |
| OUTPUT FROM FIRST DECODER | B0 | B1 | I2 | P3 | | | | | | | | |
| INPUT TO SECOND DECODER DI2 | DP3 | DP4 | DP5 | DP8 | DB7 | DP11 | DB9 | DB10 | | | | |
| OUTPUT FROM SECOND DECODER | | | | | B7 | P8 | B9 | B10 | P11 | | | |
| OUTPUT SELECTION | 1 | 1 | 1 | 1 | 2 | 2 | 2 | 2 | 2 | | | |
| REPRODUCED OUTPUT | B0 | B1 | I2 | P3 | B7 | P8 | B9 | B10 | P11 | | | |

COMPRESSED IMAGE DATA REPRODUCING APPARATUS AND METHOD THEREOF

BACKGROUND OF THE INVENTION

The present invention relates to a compressed image data reproducing apparatus and a method thereof, which realize to reproduce compressed image data normally and to reproduce the compressed image data in non-linear editing reproduction, in particular, to which a data structure control technology is applied. That is, at an image coding apparatus having a motion compensation means represented at the moving picture experts group (MPEG) 2 coding system stipulated by the generic coding of moving pictures and associated audio information, ISO/IEC 13818, special reproduction and editing reproduction of the compressed image data are easily executed at the image coding apparatus, in which a frame or field structure is changed, by using the data structure control technology.

DESCRIPTION OF THE RELATED ART

At a conventional compressed image data reproducing apparatus and a method thereof, for example, the MPEG 2 coding system has been used. Because the MPEG 2 coding system is stipulated as a standard to efficiently compress images and audio contents and has been used such as at a digital versatile disk (DVD)-VIDEO and a digital video broadcasting.

At the MPEG 2, generally, an I picture does not include motion compensation and signifies an intra-frame coded image that is coded only in images to be coded. And a P picture signifies an inter-frame coded image that is composed of using a forward direction prediction from an I picture or a P picture at the past time. And a B picture signifies an inter-frame coded image composed of using a bidirectional prediction from an I picture or a P picture existing at before and after the time.

In order to make a random access possible, a group of pictures (GOP) signifies a structure of a group of pictures composed of one I picture, plural P pictures, and/or plural B pictures. As a variable value that signifies the number of frames in this GOP, N is used. And as a variable value that signifies an interval emerging an I picture or a P picture in the GOP, M is used. The values N=15 and M=3 are generally used in view of such as compression efficiency, error robustness, and special reproducing.

FIG. 1 is a diagram showing a conventional GOP structure and coding order in case that N=15 and M=3. In FIG. 1, the coding order shows a picture type and input order when a picture is coded. For example, "I2" signifies that a picture inputted at the second is coded to an I picture. As shown in FIG. 1, one GOP is composed of one I picture, four P pictures, and ten B pictures. And the interval between an I picture and a P picture, and the interval between two P pictures is 3 from the M=3. In case of an open GOP structure in which the prediction structure between adjacent GOPs is not closed, "B15, B16" pictures are predicted by one previous P picture and an I picture in the current GOP, that is, by the P14, and I17. And in case of a closed GOP structure in which the prediction structure between adjacent GOPs is closed, the "B15, B16" pictures are predicted by only the I picture in the current GOP, that is, by only the I17. As shown in FIG. 1, at the coding order, the coding is executed after the input order is changed. As mentioned above, when M>1, it is necessary that the order of inputted pictures is changed for the motion compensation.

FIG. 2 is a diagram showing a conventional GOP structure and coding order in case that N=15 and M=1. As shown in FIG. 2, one GOP is composed of one I picture and 14 P pictures. When the M=1, the prediction structure is closed regardless of the open or closed GOP structure. Therefore, in case that the M=1, pictures are coded by the input order.

In this case it is impossible to search the coded data by utilizing the time correlation and the variable length codes that the MPEG 2 utilizes. However, as mentioned above, one I picture is disposed in one GOP structure, therefore the search function can be realized by utilizing only one I picture, hereinafter, this function is called as an I picture search. And when M>1, a smoother searched image can be outputted by decoding the P pictures in addition to the I picture rather than the I picture search, hereinafter, this function is called as an IP picture search.

Referring to FIG. 1, the I picture search and the IP picture search at that N=15, and M=3 are explained. First, the order of the inputted pictures is changed. At the I picture search, only the secondarily inputted I2 is reproduced, and the I2 is repeatedly reproduced until the next I picture I17 is reproduced. And at the IP picture search, the pictures I2, P5, P8, P11, and P14 are reproduced every three frames, therefore, a five times smoother reproduced image can be obtained compared with the I picture search.

And a large capacity optical disk has a function of a high speed random access. Therefore, at the large capacity optical disk, for recorded plural video contents, not operating the whole of the data, an editing and reproducing function, which reproduces an image like one contents based on editing point information, can be realized. With this, for example, an image can be reproduced by skipping only a commercial message (CM) part.

However, at a coding apparatus used the MPEG 2, the variable value N has been utilized to increase the compression efficiency by changing to a new GOP at the time when a scene is changed, but the variable value M has not been utilized. And an encoder used now is a high price, but an encoder has been made by an LSI in an industrial use in not a high price, and it almost becomes possible that the LSI is used for consumer equipment.

The searching range at motion vector search is a major element to decide the level of the reproduced image quality. At a one chip encoder, generally, the motion vector search is executed only in a range, for example, 128 pixels×128 lines, considering the amount of the operation and the size of the circuit. Therefore, at the time when M>1, a motion vector to be searched can be searched at the time when an inputted image moves slowly. However, at the time when the inputted image moves fast, there is not a candidate vector in the searching range of the motion vector. Consequently, the coding efficiency is decreased. In order to solve this problem, when the M value is made to be variable, the variable value M=3 having the most effective coding efficiency is used at the normal operation, and the variable value M=1 is used for the inputted image whose motion is fast. With this, the coding can be executed without decreasing the coding efficiency at the motion vector search in a limited range. And when the coding is executed by using the mentioned above variable value M, a higher quality reproduced image can be obtained than that the coding is executed by a fixed value M at the normal reproduction.

As a conventional technology, Japanese Patent Application Laid-Open No. HEI 7-30850 discloses a compressed image recording and reproducing apparatus. At this application, a technology, which easily realizes a special reproduction function which reproduces only data compressed and coded in the intra-frame or the intra-field in image frames or fields coded by various compression coding methods, is disclosed.

And Japanese Patent Application Laid-Open No. HEI 7-250329 discloses an image superimposing and coding method and an apparatus thereof. At this application, a technology, in which compressed image data can be superimposed by using a inter-frame differential coding at a simple structure, is disclosed.

However, at the conventional technology mentioned above, the following problems occur at the special reproducing process. First, the IP picture search function has some restriction. Therefore, operation of a decoder at the time when the IP picture search is executed is explained. At the time when the variable value M=3, the reproduction of triple speed can be realized by reproducing only the I picture and P pictures, but at the time when the variable value M=1, the GOP is composed of only the I and P pictures. Consequently, in case that the decoder can not decode at the triple speed, the reproduction at the triple speed can not be executed. As a result, in case that the M value is variable, when the decoder does not work at the speed of the same speed of the maximum M interval, all of the P pictures in the GOP can not be decoded, and the reproduced image can not be obtained.

FIG. 3 is a diagram showing a conceptual structure of a GOP and coding order in case that the M is variable values M=3, and 1. As shown in FIG. 3, the inputted pictures "P3, P4, and P5" at the third through fifth are encoded at the M=1, and the other inputted pictures are encoded at the M=3. In case that the IP picture search of the triple speed as the M=3 is applied to these compressed image data, I2, P3, P4, P5, P8, P11, and P14 are reproduced. At the P picture, the reproduction of right before P picture is a necessary condition, therefore the P5 is needed for the reproduction of the P8.

However, the P3, P4, and P5 are sequential frames, and three frames are not decoded in one frame time. When the P5 is not reproduced, the P8, P11, and P14 are not reproduced. Consequently, when the IP picture search is executed for this kind of the compressed image data at a decoder at normal speed, there is a problem that the reproduction of images is temporarily stopped at the part of the M=1.

Secondarily, a non-linear editing function has some restriction. This non-linear editing function utilizes a high speed random access function that a disk has, and sequentially reproduces two images that are disposed separately in the time base. At the MPEG 2 coding system, the motion compensation is used, therefore in case that the starting point of the reproduction is not the head of the GOP, that is, the starting point is not an I picture, a required reproduced image can not be obtained. Consequently, in order to connect these two points seamlessly, it is necessary that two or more decoders are made to work in parallel, or a decoder that works at double speed or more is needed.

In case that the non-linear reproduction is executed by using the compressed image data of the variable value M, the required time to decode image data to be reproduced is different depending on the M structure in the GOP. And when the non-linear editing is executed seamlessly to plural video data whose M structure are different, what M value is in each part of the GOP must be known. At the MPEG 2 coding system, the M structure in the GOP is not described in the compressed image data. Consequently, the decoding time required until the reproduction is started must be controlled by an external function. However, as mentioned above, at the conventional technology, it is a premise that the M structure is a constant. Therefore, at the MPEG 2 coding system, there is not a concept to control the M structure in the GOP.

SUMMARY OF THE INVENTION

It is therefore an object of the present invention to provide a compressed image data reproducing apparatus and a method thereof, in which a smooth reproduced image and a non-linear editing reproduction can be realized at the time when an IP picture search is executed.

According to a first aspect of the present invention, there is provided a compressed image data reproducing apparatus. The compressed image data reproducing apparatus provides a storage device for memorizing a structure of a data file in which an interval emerging an intra-coded frame and inter-coded frames composed of using a forward direction prediction from the intra-coded frame or an inter-coded frame at the past time, in a group of pictures (GOP) is variable as control data, and a system control circuit for executing motion compensation used a time correlation at the time when image data compressed and coded by variable length codes are reproduced. And a high speed picture search is executed by using the control data.

According to a second aspect of the present invention, in the first aspect, the system control circuit makes images reproduce sequentially at an arbitrary frame point by using plural data files in which the interval emerging the intra-coded frame and the inter-coded frames in the GOP is different and using the control data.

According to a third aspect of the present invention, in the first and second aspect, the compressed image data reproducing apparatus further provides a first decoder which obtains compressed image data through a bus and decodes obtained compressed image data and outputs decoded data as one of reproduced image data, a second decoder which obtains compressed image data through the bus and decodes obtained compressed image data and outputs decoded data as the other reproduced image data, and a selector which outputs reproduced image data by changing over the one of reproduced image data and the other reproduced image data in a frame unit time. And non-linear editing reproduction is executed by using the reproduced image data outputted from the selector.

According to a forth aspect of the present invention, in the first and the second aspect, the system control circuit provides a quantizer and a variable length coding section and plural encoding sections which work in parallel.

According to a fifth aspect of the present invention, there is provided a compressed image data reproducing method. The compressed image data reproducing method provides the steps of; memorizing a structure of a data file in which an interval emerging an intra-coded frame and inter-coded frames composed of using a forward direction prediction from the intra-coded frame or an inter-coded frame at the past time, in a GOP is variable as control data, and controlling a system for executing motion compensation used a time correlation at the time when image data compressed and coded by variable length codes are reproduced. And a high speed picture search is executed by using the control data.

According to a sixth aspect of the present invention, in the fifth aspect, the controlling step makes images reproduce sequentially at an arbitrary frame point by using plural data files in which the interval emerging the intra-coded frame and the inter-coded frames in the GOP is different and using the control data.

According to a seventh aspect of the present invention, in the fifth aspect, the compressed image data reproducing method further provides the steps of; a first decoding for obtaining compressed image data through a bus and decoding obtained compressed image data and outputting decoded data as one of reproduced image data, a second decoding for obtaining compressed image data through the bus and decoding obtained compressed image data and outputting decoded data as the other reproduced image data, and selecting either one of the reproduced image data and outputting the reproduced image data by changing over the one of reproduced image data and the other reproduced image data in a frame unit time. And non-linear editing reproduction is executed by using the reproduced image data outputted from the selecting step.

BRIEF DESCRIPTION OF THE DRAWINGS

The objects and features of the present invention will become more apparent from the consideration of the following detailed description taken in conjunction with the accompanying drawings in which:

FIG. 6 is a diagram showing a structure of control data inputting to a system control circuit shown in FIG. 4;

FIG. 8 is a diagram showing a picture structure in a GOP in case that compressed image data have the control data shown in FIG. 6;

FIG. 9 is a diagram showing an example of control at non-linear editing reproduction at the time when the M=3 is fixed;

FIG. 10 is a diagram showing an example of control at the non-linear editing reproduction at the time when the M is variable.

DESCRIPTION OF THE PREFERRED EMBODIMENT

Figure 1:
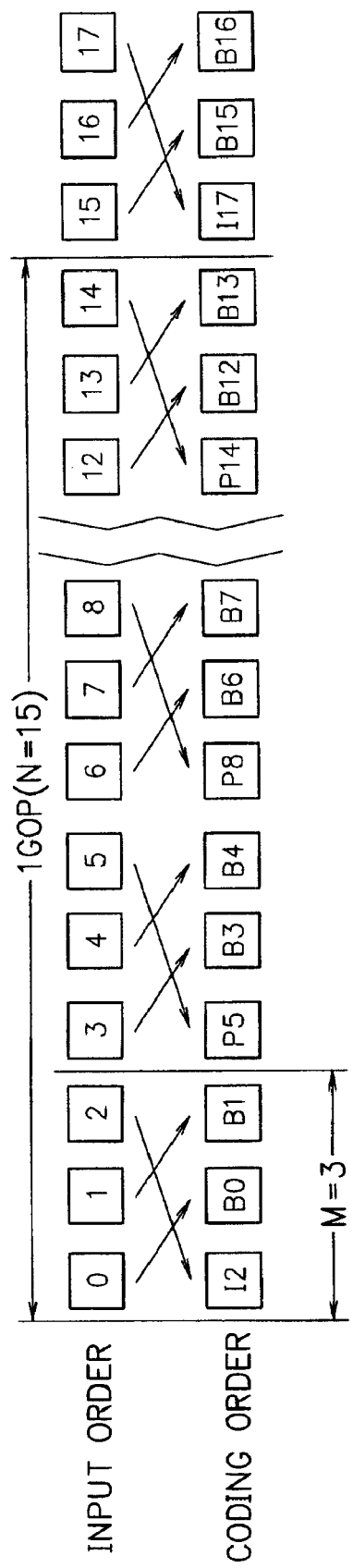
FIG. 1 is a diagram showing a conventional GOP structure and coding order in case that N=15 and M=3.
Figure 2:
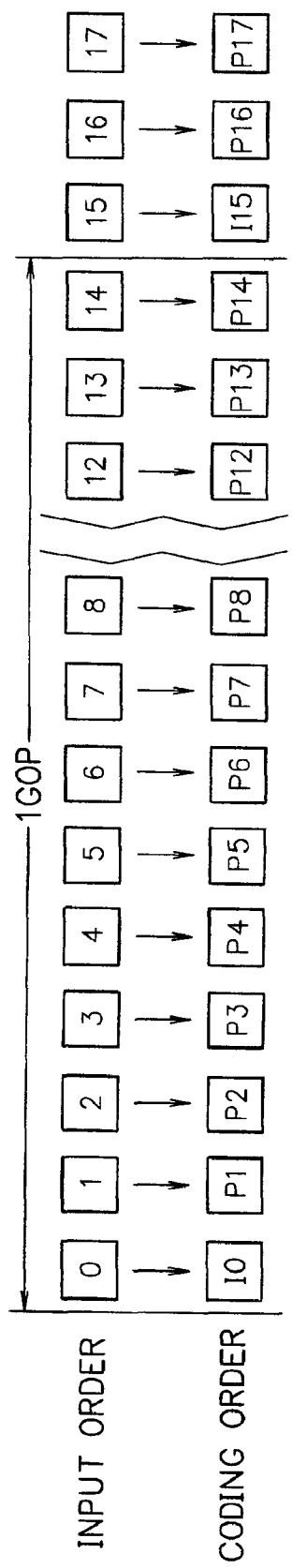
FIG. 2 is a diagram showing a conventional GOP structure and coding order in case that N=15 and M=1.
Figure 3:
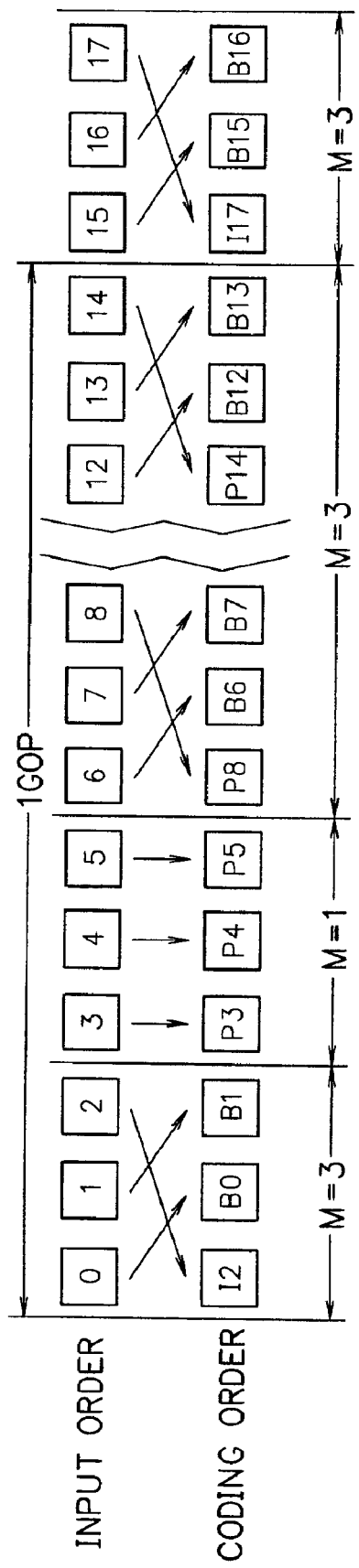
FIG. 3 is a diagram showing a conceptual structure of a GOP and coding order in case that the M is variable values M=3, and 1.

Referring now to the drawings, an embodiment of the present invention is explained in detail. At the present invention, as compressed image data, data stipulated in the MPEG 2 are used, however any compressed image data which have the same frame structure and GOP structure as the MPEG 2 has can be used at the present invention.

Figure 4:
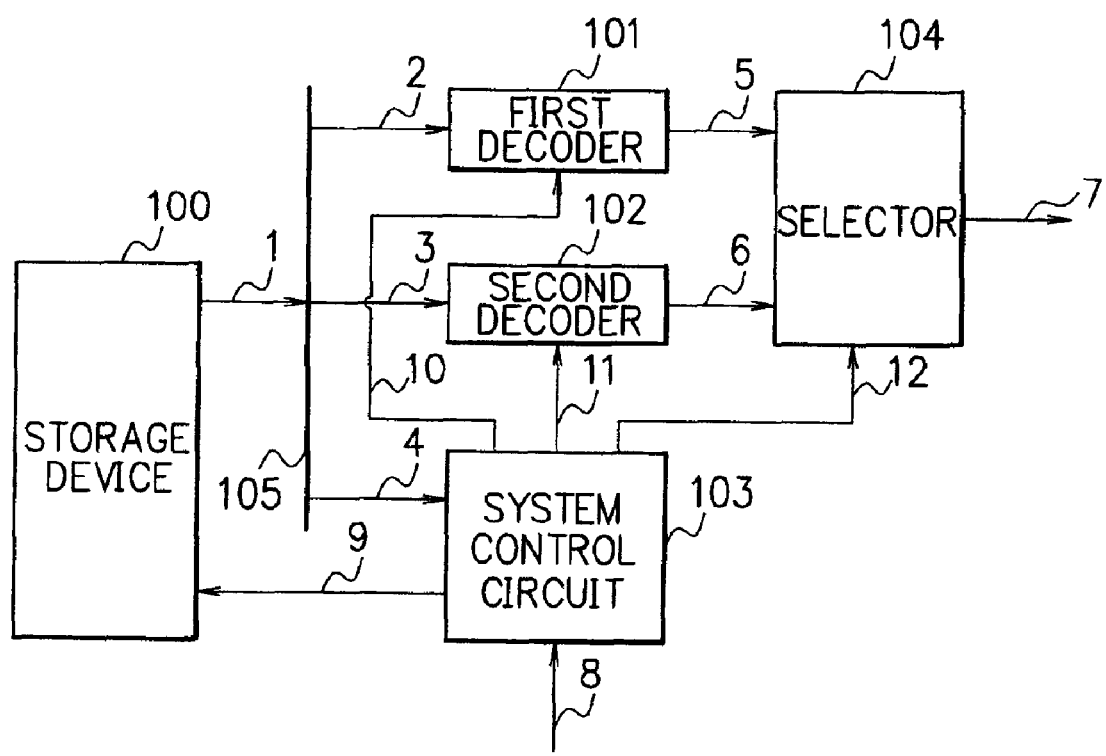
FIG. 4 is a block diagram showing a reproduction circuit of a compressed image data reproducing apparatus of the present invention.

FIG. 4 is a block diagram showing a reproduction circuit of a compressed image data reproducing apparatus of the present invention. This reproduction circuit used for a non-linear editing reproduction of the compressed image data provides two decoders. At the frame structure of the production circuit of the embodiment of the present invention, a variable value N, which signifies the number of frames in a GOP, is 15. And a variable value M, which signifies an interval emerging an I picture or P pictures in the GOP, is 3.

As shown in FIG. 4, the reproduction circuit of the compressed image data reproducing apparatus of the present invention consists of a storage device 100, a first decoder 101, a second decoder 102, a system control circuit 103, and a selector 104.

The storage device 100 is a medium to memorize the compressed image data and management information to control the compressed image data, and is actually such as an optical disk, and a hard disk (HD). The storage device 100 outputs data 1 required by a storage device control signal 9 to a bus 105. In this, the storage device control signal 9 is inputted to the storage device 100 from a port of the system control circuit 103 as shown in FIG. 4. However, the storage device control signal 9 can be inputted to the storage device 100 from the system control circuit 103 through the bus 105 such as a small computer system interface (SCSI).

The system control circuit 103 executes motion compensation used time correlation at the time when image data compressed and coded by variable length codes. And the system control circuit 103, based on an external control signal 8, outputs a first decoder control signal 10 to the first decoder 101, a second decoder control signal 11 to the second decoder 102, and a circuit selection control signal 12 to the selector 104. And further the system control circuit 103 outputs the storage device control signal 9 being a control signal executing processes such as normal reproduction, a picture search, non-linear editing reproduction to the storage device 100.

The first decoder 101 and the second decoder 102 works at normal speed. The first decoder 101 receives compressed image data 2 through the bus 105 based on the first decoder control signal 10 and decodes the received compressed image data 2, and outputs decoded reproduction image data 5 to the selector 104. The second decoder 102 receives compressed image data 3 through the bus 105 based on the second decoder control signal 11 and decodes the received compressed image data 3, and outputs decoded reproduction image data 6 to the selector 104.

The selector 104, based on the circuit selection control signal 12, changes over the decoded reproduction image data 5 and 6 in a frame time unit and outputs reproduction image data 7 to a monitor (not shown).

Figure 5:
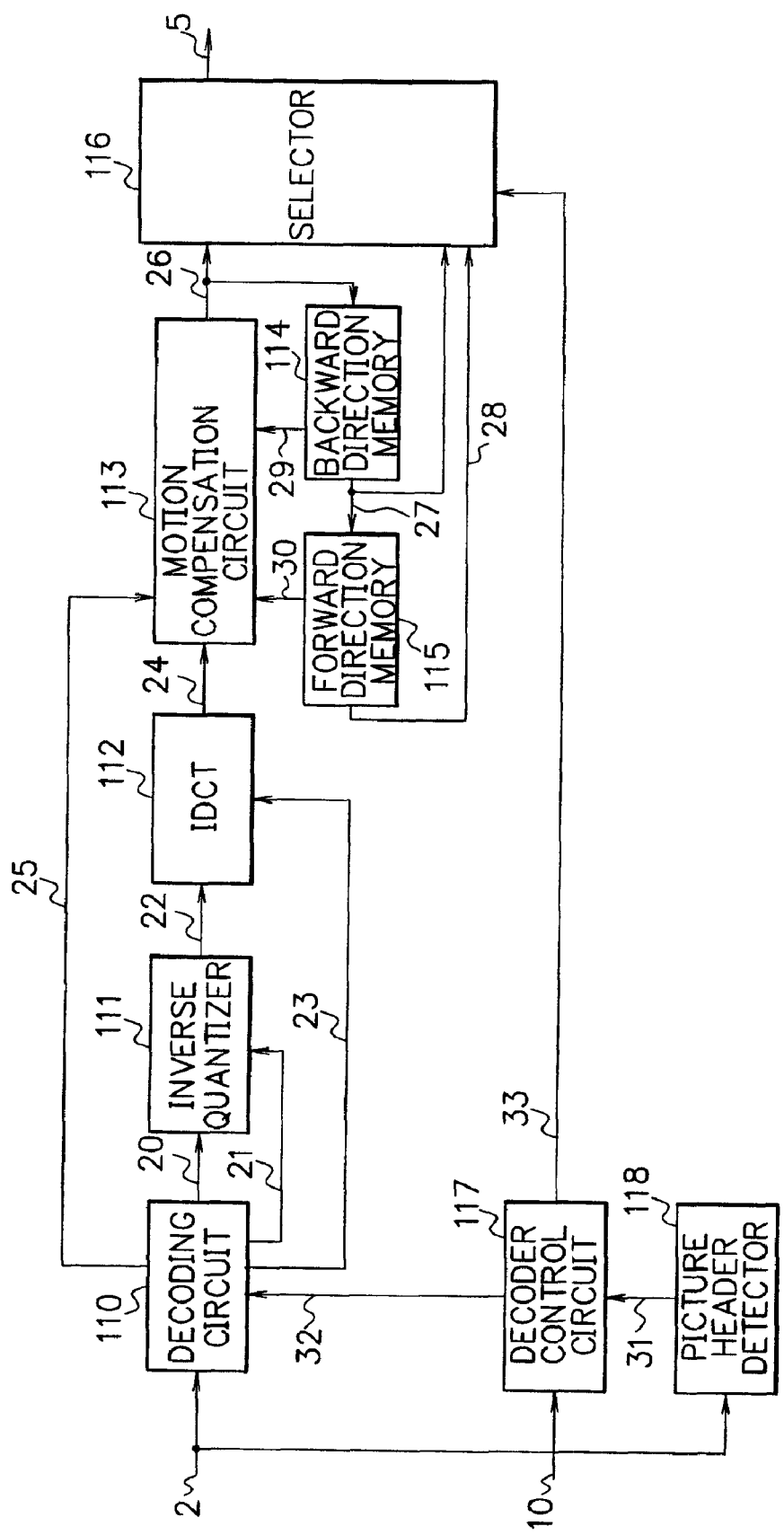
FIG. 5 is a block diagram showing a detailed structure of a first decoder shown in FIG. 4.

FIG. 5 is a block diagram showing a detailed structure of the first decoder 101 shown in FIG. 4. As shown in FIG. 5, the first decoder 101 consists of a decoding circuit 110, an inverse quantizer 111, an inverse discrete cosine transform (IDCT) 112, a motion compensation circuit 113, a backward direction memory 114, a forward direction memory 115, a selector 116, a decoder control circuit 117, and a picture header detector 118.

The decoder control circuit 117 receives the first decoder control signal 10 in a GOP unit, and based on respective reproduction modes and by using a picture type identifying signal 31 outputted from the picture header detector 118, outputs a decoding starting signal 32 to the decoding circuit 110, and outputs a reproduction image selection signal 33 to the selector 116.

The decoding circuit 110 provides a buffer memory inside it and stores data exceeding video buffering verify (VBV) buffer data using at the MPEG 2. After stored the data, the decoding circuit 110 executes a decoding process based on a starting instruction from the decoding starting signal 32.

And after this, the decoding circuit 110 outputs an inverse quantizing factor value 20 and a quantizing control value 21 to the inverse quantizer 111, and further outputs a DCT mode signal 23 to the IDCT 112. In this, the quantizing control value 21 consists of a linear or non-linear quantizing type and a quantizing step value, and the DCT mode signal 23 is a control signal which changes over a frame DCT and a field DCT.

The inverse quantizer 111 executes an inverse quantizing process by using the inverse quantizing factor value 20 and the quantizing control value 21, and outputs a DCT factor value 22 to the IDCT 112.

The IDCT 112 executes an IDCT process for the DCT factor value 22 based on the DCT mode signal 23, and outputs a prediction residual signal 24 to the motion compensation circuit 113.

When decoder reproduction image data 26 are an I picture or P pictures, the decoder reproduction image data 26 are memorized in the backward direction memory 114, and the decoder reproduction image data 26 memorized in the backward direction memory 114 are memorized in the forward direction memory 115. These writing processes can be executed by using a picture type existing at the head area of the compressed image data. Therefore, these writing processes can be executed in a short time, and a high speed memory such as a SDRAM can be used as the backward direction and forward direction memories 114 and 115, consequently, the memories 114 and 115 can be shared with a memory, which must be essentially provided separately, only for outputting the reproduction images. And at the backward direction memory 114 and the forward direction memory 115, the brightness signal is "0" at the time when the system is reset, and the color difference signal is initialized to a "128" level (in case that the image data have 8 bits brightness level). At the forward direction memory 115, the mentioned above initialization is executed at that the GOP structure is the closed GOP.

The motion compensation circuit 113 designates a memory from the backward direction memory 114 and the forward direction memory 115 and generates a macro block address by using a motion vector value instructed by the prediction residual signal 24 and motion vector data 25, and executes the motion compensation by using reproduction image data 29 and 30 being a block unit of the I or P pictures memorized in the backward direction memory 114 and the forward direction memory 115. The decoder control circuit 117 outputs the reproduction image selection signal 33 to the selector 116. The selector 116, based on the reproduction image selection signal 33, changes over the decoder reproduction image data 26, 27, and 28 in a frame unit, and outputs decoder reproduction image data 5. The structure of the second decoder 102 is the same as the first decoder 101.

Next, referring to a drawing, a control data input to the system control circuit 103 in the reproduction circuit of the present invention is explained. FIG. 6 is a diagram showing a structure of control data 4 inputting to the system control circuit 103 shown in FIG. 4. As shown in FIG. 6, the contents of the control data 4 provide a head address composed of a GOP number and a starting address, and M structure information (M structure indices 0 to 4) in the GOP, in case that N=15, and M=3 or M=1. At a system whose recording medium is a disk, a random access can be executed, therefore a high speed access can be executed from an arbitrary position by recording the head address (starting address) of each GOP.

Since N=15 and the maximum M=3, the changing points of the M structure in the GOP are 15/3=5, therefore 5 changing point information must be provided. In this, each changing point has 2 bit information, when the M=3, "3" is recorded, and when the M=1, "1" is recorded. However, for example, when the M=3 is recorded as "1", and when the M=1 is recorded as "0", each changing point has only 1 bit. In FIG. 6, the GOP of the number "0" starts from the address "0", and at the frames "0" to "2" (M structure index 0), M=3, and at the frames "3" to "5" (M structure index 1), M=3, at the frames "6" to "8" (M structure index 2), M=1, and at the frames "9" to "14" (M structure indices 3 and 4), M=3. And the GOP of the number "1" starts from the address "7", and at the frames "0" to "8" (M structure indices 0, 1, and 2), M=3, and at the frames "9" to "14" (M structure indices 3 and 4), M=1.

Figure 7:
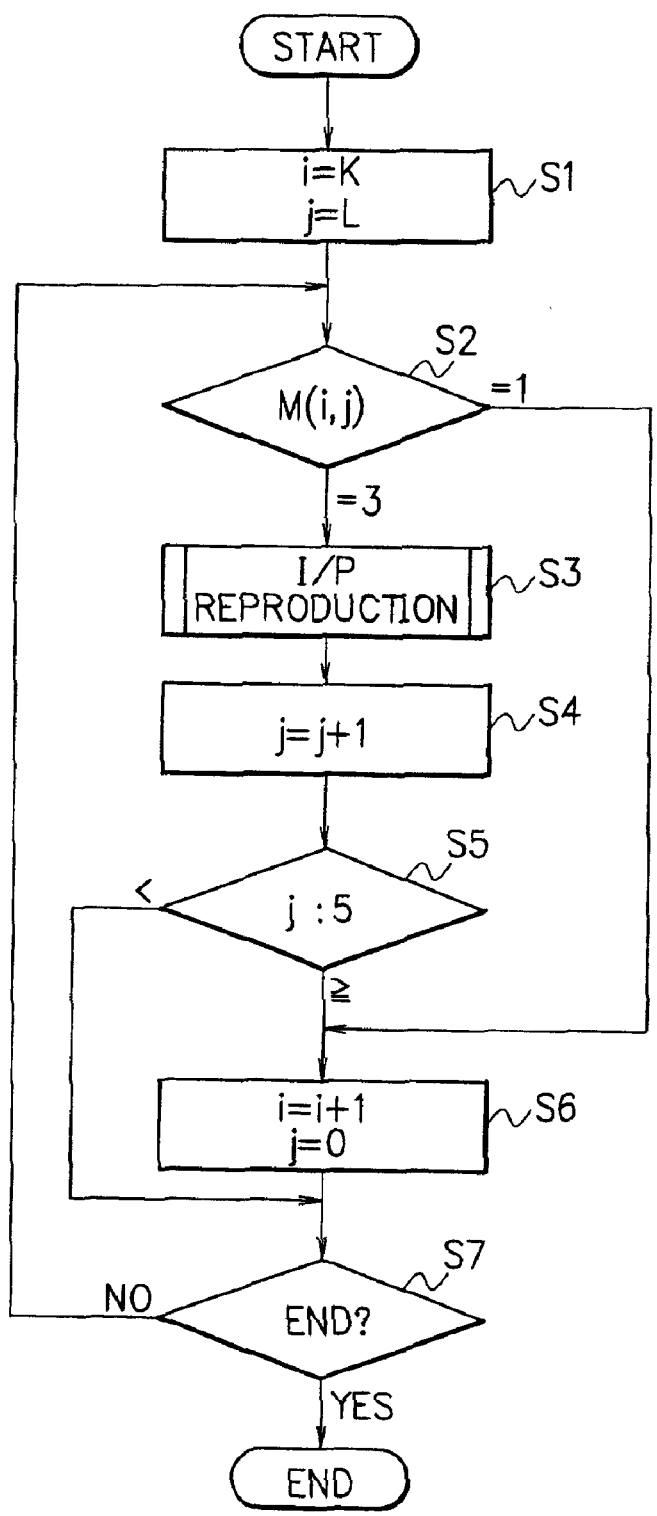
FIG. 7 is a flowchart showing an algorithm for decoder control.

Next, reproduction control of an IP picture search is explained. In order to execute the IP picture search of compressed image data whose M structure is variable, a decoding process must be controlled by the M structure in the GOP. That is, in case that an M structure of M=1 exists in the GOP, as mentioned above, at the data reproduction after the M=1, the process time is not enough at a normal speed decoder. Consequently, a user watches the image as a pause image or a normal image. Therefore, the decoder must be controlled. FIG. 7 is a flowchart showing an algorithm for decoder control. Referring to FIG. 7, the decoder control is explained. In FIG. 7, "i" signifies the number of the GOP, "j" signifies the M structure index in the GOP, and "M (i, j)" signifies the jth M structure at the ith GOP. And "K" signifies a GOP number from which the IP picture search starts, and "L" signifies a starting point at the changing point of an M structure in the GOP.

First, j=K and i=L are set (step S1). When M (i, j)=3 (step S2), a reproduction process of the I picture or the P picture is executed (step S3). Next, the process goes to the next M structure, that is, j=j+1 (step S4). And the "j" value is compared with 5 (step S5), in this, 5 is calculated by N/maximum M=15/3, the N=15 and the maximum M=3, therefore this calculated value is changed by the N value and the maximum M value. And when the value "j" is equal to 5 or more, the process goes to the head position of the next GOP (step S6). When the "j" value is smaller than 5, the M structures in the GOP has not been processed, and the process goes to step S7, and since the GOP has not been processed yet, the process returns to the step S2. When all of the GOPs have been processed, the total process ends. When M (i, j)=1 at the step S2, the steps S3, S4, and S5 are skipped, and the process goes to the head position of next GOP (step S6).

FIG. 8 is a diagram showing a picture structure in a GOP in case that compressed image data have the control data shown in FIG. 6. As shown in FIG. 6, the M structure of the GOP of the number "0" is 33133, therefore it is enough that the reproduction of pictures I2, P5, and P6 is processed every three frames. However, the frames 6 to 8 are coded at the M=1, after the picture P6 was reproduced, pictures I17, P20, P23, and P24 in the GOP of the number "1" are reproduced. The M structure of the GOP of the number "1" is 33311, therefore after the 10th frame, pictures become P pictures. Therefore the process is transferred to the GOP of the number "2", the reproduction of the IP picture search of pictures I30, P33, P36, P39, and P42 is executed.

As mentioned above, when the reproduction of the IP picture search is executed, the decoding process is executed by considering the M structure in the GOPs, therefore a smooth IP picture search image can be obtained even at the compressed image data in which a part of the M=1 exists.

Next, reproduction control at non-linear editing reproduction is explained. First, the non-linear editing reproduction, which sequentially reproduces data existing between two points whose time is different, is explained. In case that the M structure is fixed, a required decoding time to connect two images is a constant. Therefore, the non-linear editing reproduction can be easily controlled. However, in case that two compressed image data whose M structures are different each other, such as that the M structure in a GOP is variable, are sequentially reproduced, the required decoding time to connect two images is different. With this, when the control is executed as that the M structure is fixed, there is a problem that a reproduction image is stopped temporarily.

FIG. 9 is a diagram showing an example of control at the non-linear editing reproduction at the time when the M=3 is fixed. In FIG. 9, at output parts, an output frame structure and an output number are shown. For example, B0 signifies an image to be outputted at the 0th and whose frame structure is a B picture, I2 signifies an image to be outputted at the second and whose frame structure is an I picture, and P5 signifies an image to be outputted at the fifth and whose frame structure is an P picture. An input to a decoder has D showing data, in addition to a frame structure, and an output number. At a normal reproduction output, B0, B1, I2, B3, B4, P5, B6, B7, P8, B9, B10, P11 are reproduced in order. At this state, the reproduction control at the non-linear editing reproduction is explained by using decoder input and output at the first decoder 101.

An image, which is reproduced at the first, is the B0, but the frame structure is the B picture, therefore the I2 must be reproduced beforehand. Therefore, DI2 being compressed image data for reproduction of the I2 is inputted to the first decoder 101. The DI2 is decoded at the first decoder 101, but the I2 exists at after two frames, therefore the DI2 is memorized in the backward direction memory 114 in the first decoder 101.

At the second, DB0 for the reproduction of the B0 is inputted to the first decoder 101. Generally, when the GOP structure is an open GOP structure, for the reproduction of the B0 and B1, the final P picture of the right previous GOP and the reproduction image of the I2 are needed. However, assuming that the GOP structure is a closed GOP structure, the reproduction control is explained by that the motion compensation is executed by only the I2. When the DB0 is inputted to the first decoder 101, the motion compensation is executed for the DB0 by using the I2 memorized in the backward direction memory 114 in the first decoder 101, and the B0 is outputted.

At the third, DB1 is inputted to the first decoder 101 and the B1 is outputted. After this, DP5 requiring for reproduction of the B3 and B4 is inputted to the first decoder 101, but before that, the I2 memorized in the backward direction memory 114 is transferred to the forward direction memory 115. The DP5 is decoded by using the I2 in the forward direction memory 115 and is memorized in the backward direction memory 114. At this time, the image to be reproduced is the I2 in the forward direction memory 115.

At the fourth, DB3 is inputted to the first decoder 101 and decoded, and the motion compensation is executed for the decoded DB3 by using the I2 in the froward direction memory 115 and the P5 in the backward direction memory 114, and the B3 is outputted. After this, the same processes mentioned above are applied to the data inputted to the first decoder 101, and the B4, P5, B6, B7, P8, B9, B10, and P11 are reproduced.

Excluding the B4, P5, and B6 from these data outputted from the first decoder 101, processes to execute the non-linear editing reproduction of the B0, B1, I2, B3, B7, P8, B9, B10, and P11 in order are explained. In this case, the B7 must be reproduced right after the reproduction of the B3, but at the MPEG 2, in order to reproduce a B picture, an I picture or a P picture disposed before and after time the B picture must be reproduced. Therefore, in order to reproduce the B7, the reproduced images of the P5 and the P8 are needed. However, the P5 is data not requiring for the non-linear editing reproduction, and at a single decoder having the normal speed, one frame time is required to reproduce the P5, consequently seamless non-linear editing reproduction can not be realized. In order to solve this, two decoders having the same times speed are worked in parallel, and the seamless non-linear editing reproduction is executed by changing over output image signals from these two decoders.

The processes of this non-linear editing reproduction are explained. At the first decoder 101, the inputted data are reproduce by the processes mentioned above and the reproduction images B0, B1, I2, and B3 are outputted. In order that the B7 can be reproduced after the reproduction of the B3, necessary compressed image data are supplied to the second decoder 102 from three frames before the reproduction of the B7.

At the MPEG 2, even in case of the closed GOP, it is necessary that an I picture or P pictures is disposed before the time of an image to be reproduced. Therefore, in order to reproduce the B7, the DI2, DP5, and DP8 are required before the B7. In order to meet this, these compressed image data DI2, DP5, DP8 are inputted to the second decoder 102 from the three frames before the reproduction of the B7. In this, the B pictures B0, B1, B3, B4, and B6 before the B7 are not needed to decode. Therefore, it is necessary that these data are not inputted to the second decoder 102 by controlling beforehand from the outside. Or when these data are inputted to the second decoder 102, the second decoder 102 reads the header information expressing the kinds of data in the MPEG 2, and the second decoder 102 skips a decoding process for these data. With these processes mentioned above, the B7 is reproduced without any additional time.

The reproduction processes after the B7 are executed by using the normal processes mentioned at the explanation of the first decoder 101. At the decoding process for DP11, the P8 is transferred from the backward direction memory 114 to the forward direction memory 115, and the DP11 is decoded by using the P8 in the forward direction memory 115, and the decoded DP11 is memorized in the backward direction memory 114. The DB9 is decoded by using the P8 in the forward direction memory 115 and the P11 in the backward direction memory 114, and the decoded DB9 is outputted. By using the same processes mentioned above, DB10 is decoded by using the P8 and the P11, and the decoded DB10 is outputted. The selector 104 changes over the outputs in the frame unit so that the first decoder 101 is selected at the time when the B0, B1, I2, and B3 are reproduced, and the second decoder 102 is selected at the time when the B7, P8, B9, B10, and P11 are reproduced. With these processes mentioned above, the reproduced images can be obtained in the order of frames to be reproduced.

FIG. 10 is a diagram showing an example of control at the non-linear editing reproduction at the time when the M is variable. As shown in FIG. 10, three frames from 3 to 5 are that the M=1, that is, are composed of only P pictures. Consequently, the time requiring to reproduce images is different from the processes mentioned at FIG. 9. In this, the order of the non-linear editing reproduction of the reproduction images at 0 to 3 rd, and 7 th to 11 th is explained.

In order to reproduce images in the order of B0, B1, I2, and P3, the compressed image data DI2, DB0, DB1, and DP3 are inputted to the first decoder 101 with this order, and the B0, B1, I2, and P3 are reproduced with this order. In order to reproduce the B7 at the time right after the P3, the DI2, DP3, DP4, DP5, and DP8 are sequentially inputted to the second decoder 102 from five frames before the reproduction of the B7. In order to reproduce compressed image data whose M structures are different in the GOP from S frame in the GOP, the time to require for decoding is calculated by the following method. In this, to make the explanation simple, it is set that the M structures are two kinds, that is, M=3 and M=1. Generally, when the M=3, three frames is a minimum unit when the M structure changes.

The order of the picture structure at the time when the M=3 is Ba, Bb, and Ic or Pc, in order to reproduce the first two frames in the M structure, an I picture or a P picture at the third fame is needed to decode firstly. Consequently, the decoding time requires one extra frame time. When the reproduction is executed from the third frame in the M structure, two B pictures before the P picture are not needed to reproduce, therefore the decoding time is not required. Therefore, when the starting position frame S in the GOP is divided by 3 and the reminder is "0", that is, the reproduction is started from the Ic, consequently an extra time for decoding B pictures to be subjects is not needed, and the frame delay is "0". When the reminder is "1", that is, the reproduction is started from the Ba, the frame delays by 1. And when the reminder is "2", that is, the reproduction is started from the Bb, the Ba is not needed for the reproduction of the Bb, therefore the frame delays by 1.

The order of the picture structure at the time when the M=1 is Pa, Pb, and Pc, therefore the order of the inputted images is not needed to change. Consequently, at the time when the Pa is reproduced, the frame delay is "0", at the time when the Pb is reproduced, the frame delay is "1", and at the time when the Pc is reproduced, the frame delay is "2".

In order to start the reproduction of images from an aimed frame position in the GOP, by obtaining the M structure in the GOP at the reproduction starting point, an exact outputting point of the reproduced images can be obtained.

Figure 11:
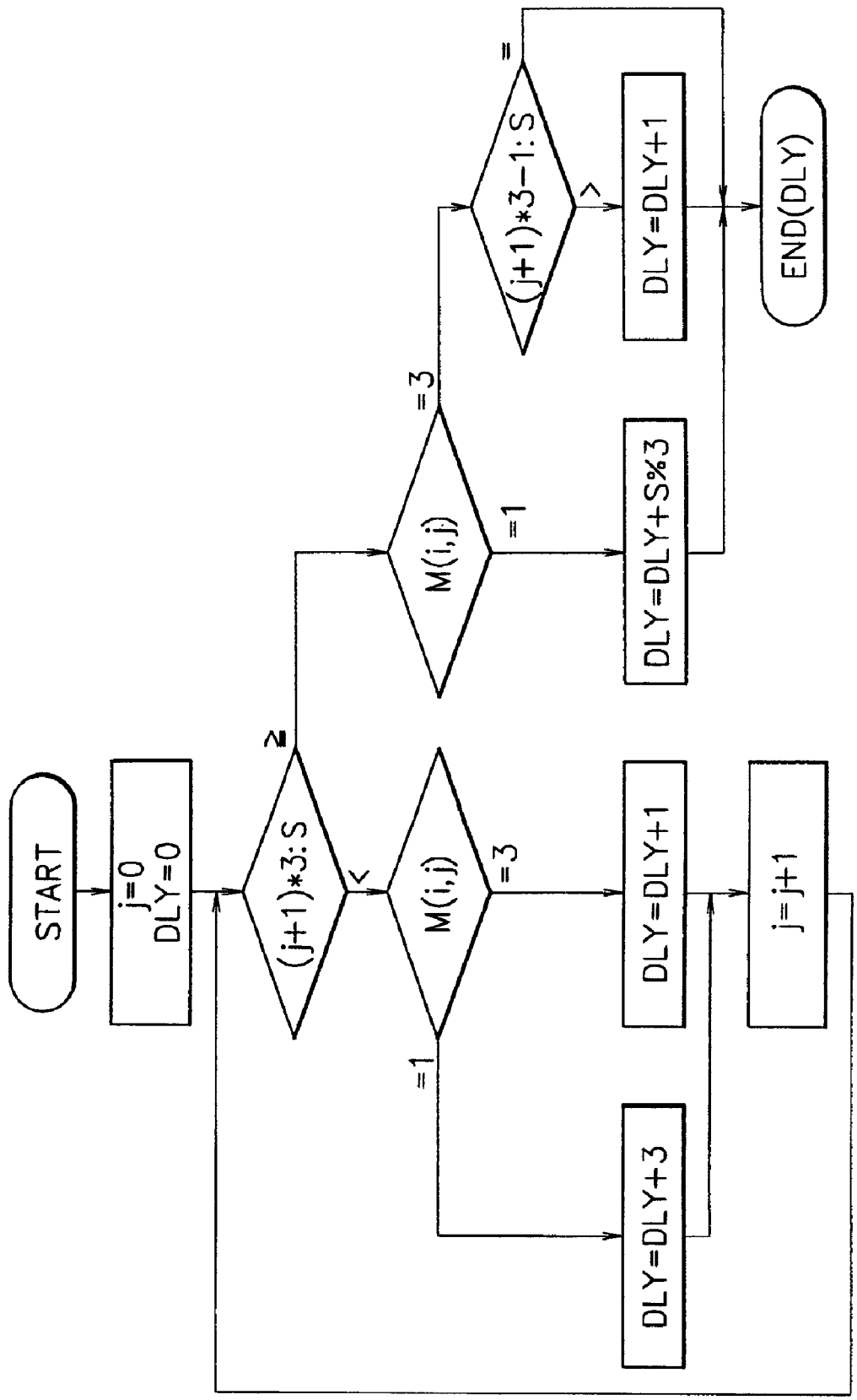
FIG. 11 is a flowchart showing processes to obtain a frame delay requiring for the reproduction of images.

Next, referring to a drawing, processes to obtain the frame delay requiring for the reproduction of images are explained. FIG. 11 is a flowchart showing processes to obtain the frame delay requiring for the reproduction of images. In FIG. 11, the same function in FIG. 7 has the same name. That is, "i" signifies the number of the GOP, "j" signifies the M structure index in the GOP, and "M (i, j)" signifies the jth M structure at the ith GOP.

In FIG. 11, "S" signifies a reproduction starting frame number in a GOP, and "%" signifies a calculation of the reminder, and "DLY" signifies the number of frames requiring for the reproduction of images. For example, as shown in FIG. 9, at the second decoder 102, when the B7 is outputted, the DLY being the number of frames requiring for the reproduction of the B7 is calculated as 3. First, DLY= 0+1=1, from M (0, 0)=3. And DLY=1+1=2, from M (0, 1)=3. And from M (0, 2)=1 and (2+1)×3−1=8>7, DLY=2+1=3.

And in case of FIG. 10, at the second decoder 102, even when the B7 is outputted as the first output, the DLY being the number of frames requiring for the reproduction of the B7 is calculated as 5. First, DLY=0+1=1, from M (0, 0)=3. And DLY=1+3=4, from M (0, 1)=1. And from M (0, 2)=3 and (2+1)×3−1=8>7, DLY=4+1=5. With this calculation, it is understandable that 5 frames are needed to delay, and the seamless reproduction of images can be realized by an exact calculation at an arbitrary point.

As mentioned above, the system control circuit 103 shown in FIG. 4 controls the IP picture search reproduction control shown in FIG. 7, and controls the non-linear editing reproduction of images shown in FIGS. 9 and 10, by using the control data shown in FIG. 6. With this, in case that the reproduction of images is executed at the compressed image data whose M value is variable in the GOP or at the plural compressed image data whose M values are different, which is not possible before, a smooth high speed picture search and the non-linear editing reproduction of images can be realized.

At the compressed image data reproducing apparatus of the present invention, in which the coding efficiency can be increased by changing the M structure in the GOP, the information of the M structure in the GOP is added to compressed image data as user data, or is recorded in an external file. The changing unit of the M structure is decided to be the least common multiple of the M values used at an encoder when the encoder encodes data from the head of the GOP. For example, in case that the M values change between M=3 and M=2, the changing unit is the least common multiple of 3 and 2, that is, 6. Therefore, the changing over is executed by using the changing unit 6 from the head of the GOP. And in case that the M values change between M=3 and M=1, the least common multiple becomes 3. Therefore, the changing over can be executed by 3 frame unit in the GOP. At the MPEG 2, the maximum M value is 3, therefore generally 2 bit information is given at three frame unit. However, the M=2 is not used actually, therefore when the M=3 and M=1 are used, by giving 1 bit information at three frame unit, the information of changing point of the M value can be controlled.

At the present invention, in the user data area in the compressed image data or the external file, the information, which is the number of changing points that can be obtained at the maximum frame unit of the M values that can be obtained at the time of encoding, is recorded. With this structure, at the time when the data are encoded, by using the starting point information every GOP and the control data recorded the M structure, even the compressed image data have a variable M value, a seamless non-linear editing reproduction and further a smooth IP picture search can be realized.

As mentioned above, at the compressed image data reproducing apparatus and method thereof of the present invention, a data file structure, in which the interval between intra-coded frames and intercoded frames becomes variable, is memorized as control data. And when the image data, which are compressed and coded by variable length codes, are reproduced, the motion compensation is applied by using the time correlation. Therefore the high speed picture search can be realized by using the control data. And the variable M values in the GOP are memorized at an M value frame unit, therefore an external connecting system can exactly understand the frame structure in the GOP, consequently various editing and reproducing functions can be realized. Further, even when the M structure in the GOP is variable, the smooth IP picture search can be realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A Compressed image data reproducing apparatus, comprising:
a storage device for memorizing as control data a structure of a data file in which an interval including an intra-coded frame and an inter-coded frame composed using a forward direction prediction from said intra-coded frame or an inter-coded frame at the past time, in a group of pictures (GOP) is variable;
a system control circuit for executing motion compensation using a time correlation at the time when image data compressed and coded by variable length codes are reproduced, wherein:
a picture search is executed by using said control data;
further comprising:
a first decoder which obtains compressed image data through a bus and decodes obtained compressed image data and outputs decoded data as first reproduced image data;
a second decoder which obtains compressed image data through said bus and decodes obtained compressed image data and outputs decoded data as second reproduced image data; and
a selector which outputs reproduced image data by changing over said first reproduced image data and said second reproduced image data in frame unit time, wherein non-linear editing reproduction is executed by using said reproduced image data outputted from said selector.

2. A compressed image data reproducing apparatus in accordance with claim 1, wherein:
said system control circuit reproduces images sequentially at an arbitrary frame point by using plural data files in which said interval emerging said intra-coded frame and said inter-coded frames in said GOP is different and using said control data.

3. A compressed image data reproducing apparatus in accordance with claim 2, further comprising:
a first decoder which obtains compressed image data through a bus and decodes obtained compressed image data and outputs decoded data as one of reproduced image data;
a second decoder which obtains compressed image data through said bus and decodes obtained compressed image data and outputs decoded data as the other reproduced image data; and
a selector which outputs reproduced image data by changing over said one of reproduced image data and said other reproduced image data in a frame unit time, wherein non-linear editing reproduction is executed by using said reproduced image data outputted from said selector.

4. A compressed image data reproducing method comprising the steps of:
memorizing as control data a structure of a data file in which an interval including an intra-coded frame and an inter-coded frame composed using a forward direction prediction from said intra-coded frame or an inter-coded frame at the past time, in a GOP is variable;
controlling a system for executing motion compensation using a time correlation at the time when image data compressed and coded by variable length codes are reproduced, wherein:
a picture search is executed by using said control data, wherein said controlling step reproduces images sequentially at an arbitrary frame point by using plural data files in which said interval emerging said intra-coded frame and said inter-coded frames in said GOP is different and using said control data;
further comprising steps of:
a first decoding for obtaining compressed image data through a bus and decoding obtained compressed image data and outputting decoded data as first reproduced image data;
a second decoding for obtaining compressed image data through said bus and decoding obtained compressed image data and outputting decoded data as second reproduced image data; and
selecting one of said first reproduced image data and said second reproduced image data and outputting said reproduced image data by changing over one of reproduced image data and said other reproduced image data in a frame unit time,
wherein non-linear editing reproduction is executed by using said reproduced image data outputted from said selecting step.

5. A compressed image data reproducing method in accordance with claim 4, further comprising the steps of:
a first decoding for obtaining compressed image data through a bus and decoding obtained compressed image data and outputting decoded data as one of reproduced image data;
a second decoding for obtaining compressed image data through said bus and decoding obtained compressed image data and outputting decoded data as the other reproduced image data; and
selecting either one of said reproduced image data and outputting said reproduced image data by changing over said one of reproduced image data and said other reproduced image data in a frame unit time, wherein non-linear editing reproduction is executed by using said reproduced image data outputted from said selecting step.

6. A compressed image data reproducing apparatus, comprising:
a first decoder for acquiring compressed image data from a storage device, performing a decode process and outputting a first reproduction image data;
a second decoder for acquiring compressed image data from a storage device, performing a decode process and outputting a second reproduction image data;
a selector for selecting an output between said first reproduction image data and said second reproduction image data; and
a system control circuit for controlling said first decoder, said second decoder and said selector.

7. The compressed image data reproducing apparatus as claimed in claim 6, wherein said system control circuit controls said first decoder, said second decoder and said selector in reference to control data, which is stored in said storage device, of compressed image data.

8. The compressed image data reproducing apparatus as claimed in claim 7, wherein said control data holds a data file structure which has a variable interval between an intra-coded frame and an inter-coded frame.

9. A compressed image data reproducing method, comprising the steps of:
outputting reproduction image data from multiple decoders which independently decode compressed image data acquired from a storage device;
selecting an output between said first reproduction image data and said second reproduction image data, wherein outputting reproduction image data and selecting an output are controlled by a system control circuit.

10. The compressed image data reproducing method as claimed in claim 9, wherein said system control circuit refers to control data, which is stored in a storage device, of compressed image data.

11. The compressed image data reproducing method as claimed in claim 10, wherein said control data holds a data file structure which has a variable interval between an intra-coded frame and an inter-coded frame.

* * * * *